US011394925B1

(12) United States Patent
Faulkner et al.

(10) Patent No.: US 11,394,925 B1
(45) Date of Patent: Jul. 19, 2022

(54) AUTOMATED UI AND PERMISSION TRANSITIONS BETWEEN PRESENTERS OF A COMMUNICATION SESSION

(71) Applicant: MICROSOFT TECHNOLOGY LICENSING, LLC, Redmond, WA (US)

(72) Inventors: Jason Thomas Faulkner, Seattle, WA (US); Shalendra Chhabra, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/364,747

(22) Filed: Jun. 30, 2021

(51) Int. Cl.
  *H04N 7/15* (2006.01)
  *H04L 65/60* (2022.01)
  *G06F 3/01* (2006.01)
  *H04L 65/403* (2022.01)

(52) U.S. Cl.
  CPC ............. *H04N 7/157* (2013.01); *G06F 3/017* (2013.01); *H04L 65/403* (2013.01); *H04L 65/601* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 11,265,510 B2* | 3/2022 | Tang | ...................... | H04N 7/147 |
| 2011/0320529 A1* | 12/2011 | Mentchoukov | ....... | G06F 16/958 709/203 |
| 2014/0310645 A1* | 10/2014 | Hunt | ..................... | G06F 3/0485 715/803 |
| 2016/0196006 A1* | 7/2016 | Doan | .................... | G06F 3/0488 715/779 |
| 2016/0285921 A1* | 9/2016 | Savostiyanov | ..... | H04L 65/1093 |
| 2016/0308920 A1* | 10/2016 | Brunsch | ................. | H04N 7/147 |

* cited by examiner

*Primary Examiner* — Phung-Hoang J Nguyen
(74) *Attorney, Agent, or Firm* — Scott Y. Shigeta; Newport IP, LLC

(57) ABSTRACT

A system provides automated transitions between presenters of a communication session. During a meeting, a system can provide a user interface that includes a primary presenter region configured to display a rendering of a presenter and the presenter's shared content. The user interface can also provide an audience region, which may include a number of individual video streams of audience members arranged in virtual environment. When the system determines that an individual audience member raises their hand, the system generates a graphical notification indicating that the person raised their hand. The system can also automatically add that individual audience member to a presenter queue. When the first presenter completes their presentation, the system can automatically transition the user listed in the presenter queue to the primary presenter region or a secondary presenter region. The system can also automatically change permissions for users that initiate a transition to a presenter role.

20 Claims, 12 Drawing Sheets

AUTOMATED UI AND PERMISSION TRANSITIONS BETWEEN PRESENTERS OF A COMMUNICATION SESSION

BACKGROUND

There are a number of different types of collaborative systems that allow users to communicate. For example, some systems allow people to collaborate by sharing content using video streams, shared files, chat messages, emails, etc. Some systems provide user interface formats that allow users to share content with an audience. Such systems can provide specific sets of permissions that allow users to take specific roles, such as a presenter, audience member, etc.

Although some systems can provide specific sets of permissions for users to take on certain roles, such systems have a number of drawbacks. For instance, when an audience member wishes to become a presenter, each user must perform a number of coordinated actions for such a transition to occur. First, the first presenter may have to relinquish presentation access permissions before allowing a second user to provide a number of manual operations to take on a presenter role. Such an interaction model can be cumbersome and inefficient. These coordinated operations can detract from the features of a communication system and distract users during meeting. Such distractions can cause participants of a meeting to miss salient information.

In addition to introducing potentially inefficient user interaction models, some existing systems can present a number of security issues as well. By requiring users to provide a number of manual steps to change user permissions during a meeting can lead to unintended permission settings. Such an arrangement can create a number of attack vectors and expose stored content to a number of security threats.

Some existing systems attempt to address the aforementioned security issues by assigning a fixed set of permissions to certain events, e.g., a set of permissions for a team meeting versus another set of permissions for a company meeting. Although this arrangement helps address some security concerns, these security measures do not provide the flexibility that is needed to accommodate many user scenarios, particularly when different users are transitioning to different roles. When systems do not optimally provide permissions that can be automatically adjusted during an event, users may not be able to access all of the shared information. This can lead to an inefficient user interaction model and lead to inefficient use of computing systems, particularly if users need to use additional resources to retrieve missed information. Thus, in addition to having a number of security issues, some current systems can create redundant use of computing resources and a number of inefficiencies with respect to the use of network resources, storage resources, and processing resources.

SUMMARY

The techniques disclosed herein provide automated transitions between presenters of a communication session. During a meeting, a system can provide a user interface that includes a primary presenter region configured to display a rendering of a presenter and the presenter's shared content. The user interface can also provide an audience region, which may include a number of individual video streams of audience members arranged in virtual environment. When the system determines that an individual audience member raises their hand, the system generates a graphical notification indicating that the person raised their hand. The system can also automatically add that individual audience member to a presenter queue. When the first presenter completes their presentation, the system can automatically transition the user listed in the presenter queue to the primary presenter region or a secondary presenter region. The system can also automatically change permissions for users that initiate a transition to a presenter role.

The techniques disclosed herein can provide a number of technical effects including enhancing the security of a communication system. By automating the assignment of specific permissions according to role transitions, a system can enhance security by mitigating the need for users to perform manual steps to change permissions during an event. Automatically assigned permissions that are based on role transitions can reduce the need for a manual input for changing permissions and thereby reduce introduction of human error. Such an arrangement can reduce the number of attack vectors and exposure to a number of security threats.

In addition to improving the security of a system, the techniques disclosed herein can provide a number of efficiencies. For instance, by providing automated transitions between presenters of a communication session, a computing device can effectively display information in specific formats using custom sets of permissions for providing complex sharing paradigms. By providing automatic transitions based on a predetermined gesture, users can focus on a presentation instead of taking time to configure a number of permissions to transition to a new presenter in a meeting. When information is organized more accurately and with fewer manual inputs, a user is less likely to miss salient information during an event. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The techniques disclosed herein also provide a system with a granular level of control when aligning permissions to specific roles of an event. Such features can also lead to a more desirable user experience. In particular, by automatically controlling user interface transitions and managing permissions, a system can reduce the number of times a user needs to interact with a computing device to control the format of a presentation and to update security permissions. This can lead to the reduction of manual data entry that needs to be performed by a user. By reducing the need for manual entry, inadvertent inputs and human error can be reduced. This can ultimately lead to a reduction in undesirable permissions and more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
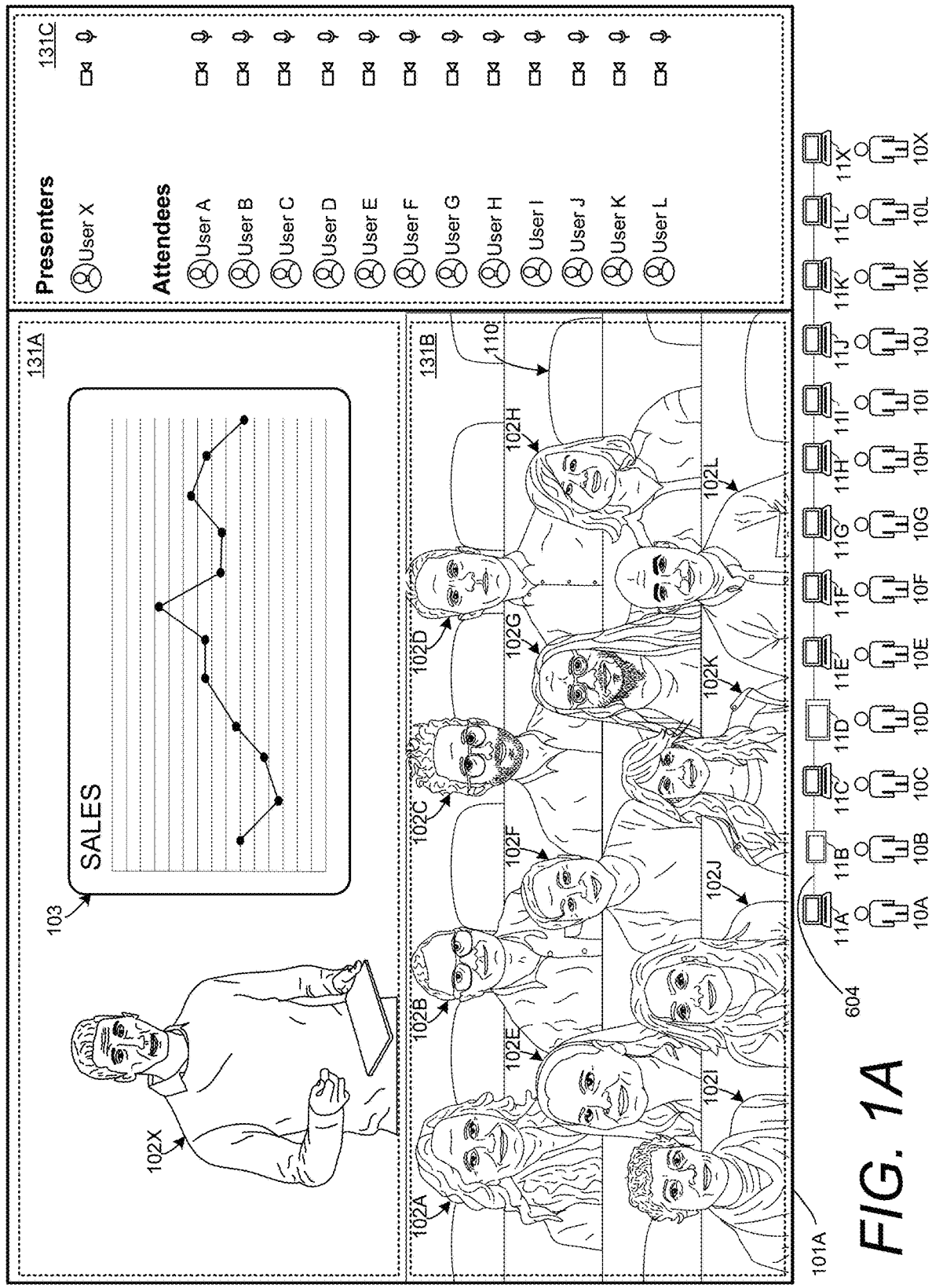
FIG. 1A is a block diagram of a system and an example user interface for providing automated transitions between presenters of a communication session.

The techniques disclosed herein can provide a number of technical effects including enhancing the security of a communication system. By automating the assignment of specific permissions according to role transitions, a system can enhance security by mitigating the need for users to perform manual steps to change permissions during an event. Automatically assigned permissions that are based on role transitions can reduce the need for a manual input for changing permissions and thereby reduce introduction of human error. Such an arrangement can reduce the number of attack vectors and exposure to a number of security threats. A user can request to present content to a specific user interface region, and in response, the system can change the role of that user to a presenter or a secondary presenter. The system can then change that user's permissions to display content in the requested region for period of time or until a meeting transitions from one phase to another.

In addition to improving the security of a system, the techniques disclosed herein can provide a number of efficiencies. For instance, by providing automated transitions between presenters of a communication session, a computing device can effectively display information in specific formats using custom sets of permissions for providing complex sharing paradigms. By providing automatic transitions in response to one or more predetermined gestures, users can focus on a presentation instead of taking time to configure a number of permissions to transition to a new presenter in a meeting. When information is organized more accurately and with fewer manual inputs, a user is less likely to miss salient information during an event. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The techniques disclosed herein also provide a system with a granular level of control when aligning permissions to specific roles of an event. Such features can also lead to a more desirable user experience. In particular, by automatically controlling user interface transitions and managing permissions, a system can reduce the number of times a user needs to interact with a computing device to control the format of a presentation and to update security permissions. This can lead to the reduction of manual data entry that needs to be performed by a user. By reducing the need for manual entry, inadvertent inputs and human error can be reduced. This can ultimately lead to a reduction in undesirable permissions and more efficient use of computing resources such as memory usage, network usage, processing resources, etc.

The techniques disclosed herein provide systems for optimizing the use of computing resources and to improve user engagement by controlling the position of video stream renderings and controlling permissions for various users during user interface transitions for different presenters of a communication sessions. The techniques disclosed herein also utilize a Together Mode user interface that can reduce fatigue and promote user engagement. The disclosed techniques address a number of technical problems. For example, the disclosed techniques address inefficiencies and problems that are encountered in existing communication systems that solely utilize box grid user interface arrangements for displaying individual renderings participants of a video conference.

When a user interface primarily relies on traditional box grid formats for displaying user renderings, such arrangements can make it difficult for participants to interpret many non-verbal social cues during a video conference. These types of gestures are used during in-person meetings to guide various types of interactions. There are a number of different types of non-verbal social cues such as head nods, facial cues, body language, etc. These non-verbal social cues communicate many different emotions and intentions. For instance, non-verbal social cues can show that a person has an issue, or that a person wants to speak, or that a person agrees or does not agree. In some cases, non-verbal social cues are so automatic that audience members can even synchronize their breathing pattern to a speaker's breathing pattern. During an in-person meeting, people are constantly interpreting others' eye movements, posture, how their heads are tilted and more, and attributing meaning to those non-verbal cues. But on a video call using a traditional user interface with a grid arrangement, those movements aren't diagnostic, meaning they're not providing accurate information about what's going on. Such shortcomings of existing systems can lead to user fatigue and often lead to a user becoming disengaged.

The Together Mode features disclosed herein provide a number of benefits that helps each participant of a virtual meeting communicate non-verbal cues. For instance, a Together Mode user interface can be configured to give participants of a video conference the impression that everyone is looking at the entire group in a big virtual mirror. When using the Together Mode user interface, participants of a video conference can look at one another, lean into one another, etc.

The Together Mode user interface changes the whole user experience compared to the traditional box grid user interface arrangement. This is possible because people's brains are used to being aware of others based on their location, and the Together Mode UI is designed to manage the location of the users. The way in which people are positioned in the Together Mode UI can help make it easier for everyone to see non-verbal social cues and tell how they are responding to each other. The Together Mode UI enables participants to utilize social and spatial awareness mechanisms in the brain. This enables a participant's brain to function more naturally and provide a richer user experience that does not cause fatigue. When viewing a video conference through the Together Mode UI, users can practice some of the natural social signaling they would do in real life, e.g., social signaling that may occur during in-person meetings.

In another example of a technical effect of the present disclosure, the Together Mode UI enables users to maintain eye contact. This helps with a known issue with some existing grid-based video conferencing systems that have issues with gaze misalignment. While video conferencing systems have grown more robust and stable over the decades, there have been no real improvements to the user experience that were viable for widespread use. The grid format has fundamentally been the same over the years and such formats have been known to cause video-call fatigue. For example, if someone's face looms large in a person's visual sphere in real life, it generally causes a person to trigger a fight or flight response. In this state, that person is alert and hyper-aware, which causes amplified reactions that are automatic and subconscious, and that person's heart rate can be unnecessarily elevated. In video calls, there's often a grid with multiple faces filling the boxes, some that may be scaled at disproportionate sizes. In those traditional UI arrangements, that user experience can be overwhelming for a person's nervous system to handle.

The Together Mode UI can provide added context to user gestures that enables more effective communication by positioning renderings of individuals within a virtual environment and maintaining positions of renderings of each user. For example, when users know that they are positioned next to a person within a seating arrangement, head movements have actual meaning to each person. Gestures and subtle movements of each person have an in-person meeting feel and movements do not create the confusion that occurs in traditional grid format UI's. In some configurations, the Together Mode UI can involve a process for scaling the renderings of individuals to help give the appearance that everyone is the same room. These features can help a system cause less confusion and also help reduce fatigue. These benefits can help make a user's interaction with a computer more accurate and realistic, while providing more effective communication between users.

The Together Mode UI also enables users to readily locate individuals and interpret non-verbal social cues using natural cognitive brain functions. Such features can mitigate user fatigue and promote user engagement, as participants of a communication session are less likely to miss salient information and reduce the need for users to refer to recordings, alternative communication methods, or prolong meetings, all of which can lead to inefficient use of computing resources. The benefits of the Together Mode features can mitigate the need for redundant use of network, processor, memory, or other computing resources.

These benefits can also reduce the likelihood of inadvertent user inputs and other errors that may result when a user has to review recordings or communicate with others when salient information is missed due to a lack of user engagement. When a participant of a video conference misses salient information due to a lack of user engagement, a system may be required to retrieve, communicate, and process multiple copies of information.

Referring now to FIG. 1A, aspects of a user interface 101A having a Together Mode region 131B is shown and described below. In this example, individual users 10 are using devices 11 to participate in a communication session 603. Each device 11 can individually display a user interface 101A comprising a primary presentation area 131A, an attendee image region 131B, and an attendee queue region 131C. The primary presentation region 131A can include a display of presentation content 103 and a rendering of a presenter 102X. The system can store permission data that allows the presenter 102X to control the display of the content 103 on the user interface 101A of each user. The attendee image region 131B, also referred to herein as the Together Mode region 131B, can include individual renderings 102A-102L of the video streams of a plurality of participants 10A-10L individually communicating from remote devices 11A-11L. The attendee queue region 131C can show a status of each participant 10A-10L.

As shown, the individual renderings 102A-102L of the Together Mode region 131B each has a position relative to a seating configuration of a virtual environment 110. This example is provided for illustrative purposes, as the virtual environment 110 can be in any form, such as an office, meeting room, auditorium, stadium, etc. The user interface shown in FIG. 1A can be generated for display at any one of the devices and can display any number of participants.

In some configurations, the Together Mode region 131B provides the same view for each person in a meeting and the seating arrangement for the participants does not change over time. More specifically, the arrangement of the user renderings, e.g., the order and spacing between the renderings, are the same across each device. This is unlike some traditional grid views that show participants' videos in different locations on each person's screen and that move the boxes around during the call based on who's speaking or who joins or leaves a meeting. Since an area of the brain is devoted to spatial memory, Together Mode's consistency provides a number of benefits to reduce the cognitive load and fatigue to each user of a video conference.

Together Mode involves a user interface arrangement that gives participants of a communication session a feeling that they are in the same room. In general, when an application enables Together Mode, the application generates a user interface that arranges the participants of a communication session in one shared space. In some configurations, images of each participant can be arranged according to a seating arrangement of a virtual environment. This user interface arrangement enables each participant to feel more connected to the other participants. This user interface arrangement can be used for meetings, coffee breaks, corporate all-hands meetings, sporting events, or any other type of get together.

In some configurations, the individual renderings 102 of each participant 10 are generated using a conforming crop filter that removes any component of an image that includes a background from a participant's surrounding environment. Each video stream generated by a camera at a participant's device 11 is received and processed to produce a rendering 102 that is shaped according to the image of the user and any accessories that the user may be wearing, such as a hat, jewelry, etc. Thus, when the shaped image of the participant is positioned over an image of a virtual environment, the system can give the appearance that the participant is in the virtual environment with other participants of a communication session. These shaped renderings 102 allow viewers to focus on the depicted person without the distraction of an image of their physical surroundings.

The size of each rendering 102 of the participants may also be normalized to give the appearance that the participants are in the same room. In some examples, the renderings 102 can be resized or scaled within a threshold size difference of one another, or the renderings 102 can be resized or scaled according to predetermined dimensions suited for a particular virtual environment. For a group meeting, for example, each rendering of each participant can be scaled to fit depicted seats, desks, etc. These adjustments enable a system to give the appearance that each person is sitting together within a given setting, e.g., an office, meeting room, stadium, etc. These features are an advancement over the traditional user interface arrangements that only have a grid of boxes. The Together Mode features help create an environment that has a profound impact on the feel of a video conference.

Figure 1B:
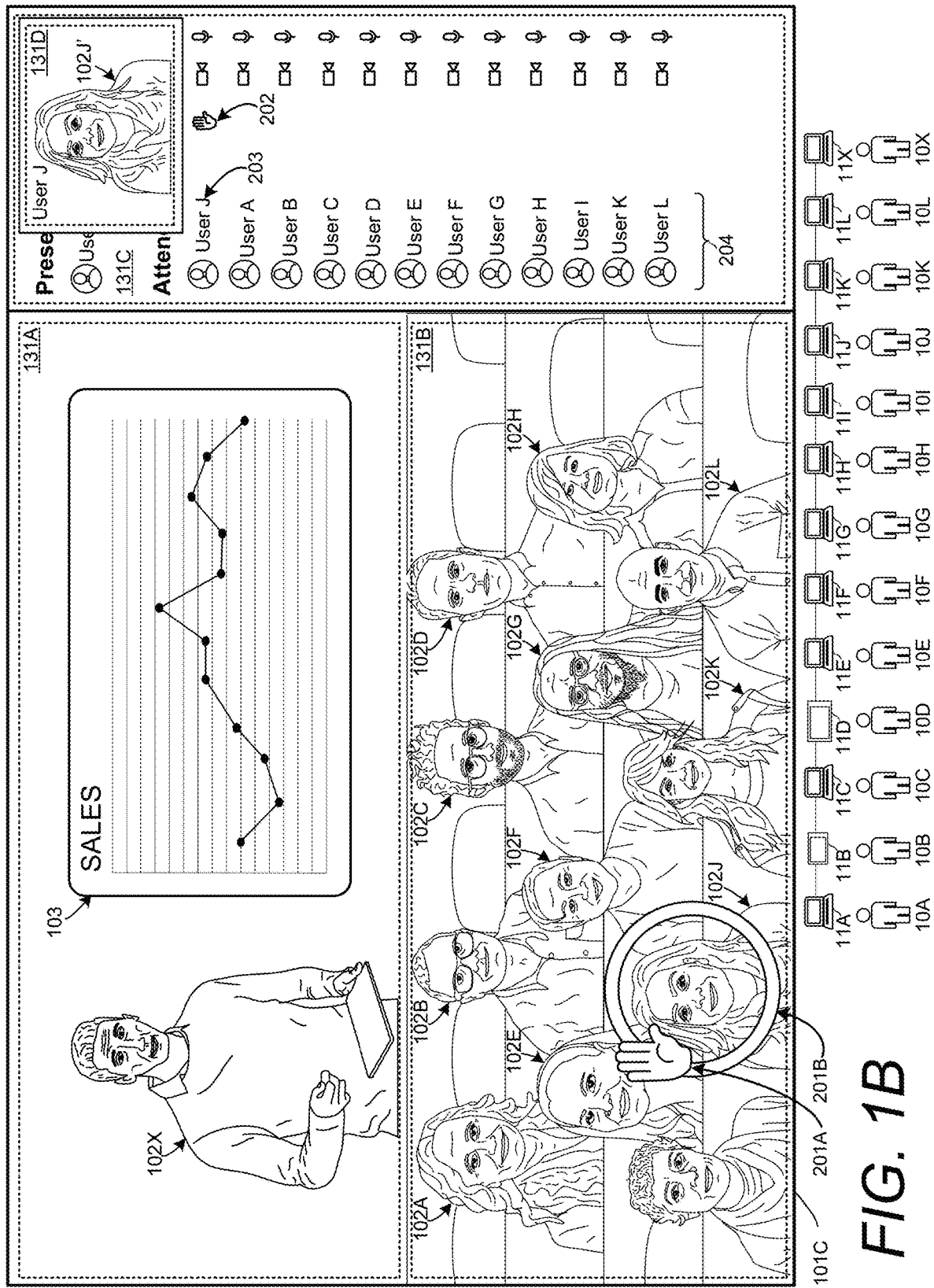
FIG. 1B is an example of an updated user interface showing a stage of a process for providing an automated transition between two different presenters of a communication session.

In some embodiments, the system 100 can further the technical benefits of the Together Mode format and increase security efficiency of a system by controlling the layout of content items and renderings during a transition between presenters of the meeting. The techniques disclosed herein can cause the execution of a number of transitions in response to a predetermined gesture of an audience member and/or one or more actions of a presenter. One example of a user interface transition is shown in FIG. 1A and FIG. 1B. In this example, a system can start with a user inface format 101A shown in FIG. 1A. In this example a presenter 10X is displayed in or near a primary presentation region 131A that displays content 103. In this example, the system can receive an input from an audience, users 10A-10L.

In this example the input is received from a computing device 11J of a user 10J. The input can indicate a request to share content. The content can include live video data, recordings, file data, or any other content and other media forms. The input can include an input from a keyboard, camera, or any other sensor of the computing device 11J. For instance, the input can be a keyboard input, a touch pad input, or a video input defining a specific gesture can indicate that a user desires to share information with others and transition the system to operate in a presentation mode.

In some configurations, the input can be generated by receiving video data defining a predetermined gesture performed by the user. This can include a camera on the computing device 11J. In some configurations, the system can generate an input when video data of the device 11J defines a predetermined gesture performed by the user 10J. The predetermined gesture can include a movement of a hand of the user in an upward direction. The predetermined gesture can also include a movement of a hand of the user in an upward direction, wherein the predetermined gesture comprises a movement of a hand of the user being raised a predetermined height.

As shown in FIG. 1B, in response to receiving the input indicating the request to share content, the system can cause a transition from the first user interface format 101A of FIG. 1A to an updated user interface format 101C shown in FIG. 1B. The user interface format 101C shown in FIG. 1B can include a primary presentation region 131A, the attendee image region 131B, the attendee queue region 131C, and a secondary presentation region 131D. The attendee image region 131B, e.g., the Together Mode region, of the updated user interface format 101C displaying one or more graphical elements 201 in association with a rendering 102J of the user 10J to indicate that the input provided by the user 10J. In this example, the first graphical element 201 can include a circle 201A around the rendering of the user 102J that provided the input. The graphical element 201 can also include a graphic that shows a raised hand 201B.

In addition, the updated user interface 101C can show a video of the attendee next in queue that is automatically displayed in the secondary presenter display region 131D. In some embodiments, the attendee queue region 131C of the updated user interface format 101C can also display a second graphical element 202 indicating the input by the user 10J. This second graphical element 202 can be displayed in association with an identifier 203 of the user 10J. The association can be made by aligning the second graphical element 202 with the identifier 203 of the user 10J that provided the input. The association can also be made by positioning the second graphical element 202 within a predetermined distance of the identifier 203 of the user 10J that provided the input.

The attendee queue region 131C can have a listing of meeting attendees that are ordered in a queue 204. The position of the identifier 203 in the user queue 204 can indicate that the user 10J is an upcoming presenter. For instance, in this example, the text reference to the user that provided the input is moved to the top of the list to indicate that that user is in the queue as the next presenter.

The attendee queue region 131C of the second user interface format 101C further comprising a second rendering 102J' of the user 10J. This rendering can be a live video feed or any suitable graphical element representing the user that provided the input. The second rendering 102J' can be positioned in proximity to the identifier 203 of the user in the user queue 204. As described in other embodiments herein, the position of the second rendering 102J' can overlap a portion of the attendee queue region 131C. The second rendering 102J' can also move to a position that allows places the second rendering 102J' in a side-by-side configuration with the attendee queue region 131C.

The system can also update permission data 714 (FIG. 10) that allows the requesting user 10J to provide content, e.g., video data or file data, to the secondary presenter display region 131D. The system can also change the permission data 714 to allow the requesting user 10J to share content with the primary presentation region 131A in response to the detection of one or more events, e.g., that the first presenter 10X has completed a presentation or when the first presenter 10X provides an input granting the requesting user 10J access to providing data ("writing") to the primary presentation region 131A.

In some configurations, the user interface formats 101A and 1010C shown in FIGS. 1A and 1B can be displayed to a designated user having a predetermined role or a predetermined set of permissions. For example, such user interface formats can be displayed only to users having predetermined roles, such as a presenter, administrator, moderator, producer, etc. In such embodiments, users with other roles, such as general audience members of a presentation are restricted from receiving the user interface formats shown in FIGS. 1A and 1B. Thus, in the example of FIGS. 1A and 1B, the computing devices 11A-11L of users 102A-102L would be restricted from displaying the user interface formats 101A and 1010C shown in FIGS. 1A and 1B.

By displaying the user interface formats 101A and 1010C shown in FIGS. 1A and 1B exclusively to designated users, the system can allow users with specific roles, such as a meeting producer, to control the content to the primary presentation region 131A. This allows the meeting producer, or other users with the appropriate permissions, to control the content that is displayed on the main stage of the primary presentation region 131A and utilize cues that are generated within the attendee queue region 131C. In such configurations, the meeting producer can select presenters from the queue to be promoted to the primary presentation region 131A. In addition, the meeting producer can also deny requests to share content and remove usernames from the queue. The meeting producer can also control the display, e.g., remove the rendering of the primary presenter 102X and the shared content 103 from the primary presentation region 131A.

Figure 1C:
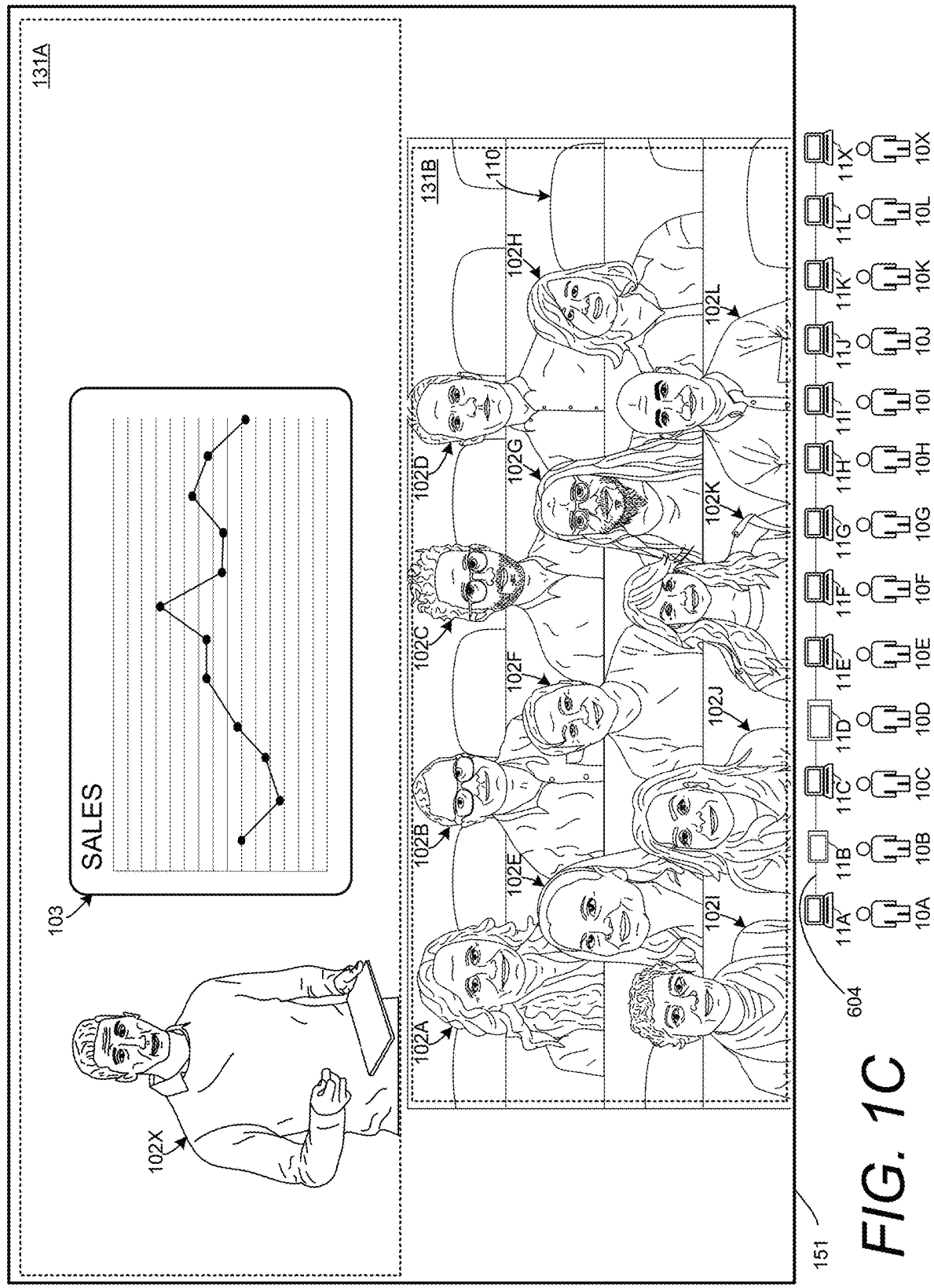
FIG. 1C is an example of a user interface showing a presentation of a communication session.

In embodiments where the user interface formats 101A and 1010C shown in FIGS. 1A and 1B are directed to a designated user, such as a producer, the system can generate an audience user interface format 151, an example of which is shown in FIG. 1C. The audience user interface format 151 can be displayed on computing devices 11A-11L that have specific roles for viewing content, e.g., audience members with permissions to view content and permissions to send requests to share content. Such users may be restricted from sharing files and audio with other audience members.

In some embodiments, the audience user interface format 151 can include a primary presentation region 131A and the Together Mode region 131B. The audience user interface format 151 does not include an attendee queue region 131C or display a queue of presenters. The primary presentation region 131A of the audience user interface format 151 can include a display of presentation content 103 and a rendering of a presenter 102X. The attendee image region 131B of the audience user interface format 151 can include individual renderings 102A-102L of the video streams of a plurality of participants 10A-10L individually communicating from remote devices 11A-11L.

Although the above-described example illustrates an embodiment that starts with the first user interface 101A of FIG. 1A and transitions to an updated user interface 101C, it can be appreciated that this transition may include interim transitions or transitions to other user interface formats. For example, FIG. 2 through FIG. 7 shows a series of user interface and permission transitions that may occur when a user provides a request to share content as a presenter. Generally described, these transitions provide different types of notifications within different regions of the user interface to alert specific users of the user's request. This example also shows a transition of a secondary video moving from one location to another location based on the detection of one or more events. Although this example shows the state of the user interface in different stages of transition, it can be appreciated that the user interface can transition from any state to another state for the purposes of accommodating different user scenarios. For example, FIG. 1A and FIG. 1B show a transition of the user interface between the versions shown in FIG. 2 and FIG. 4. However, in some embodiments, the system may provide a transition from the user interface between the versions shown in FIG. 2 directly to FIG. 6. Other embodiments may include any combination of transitions between the various user interfaces disclosed herein.

Figure 2:
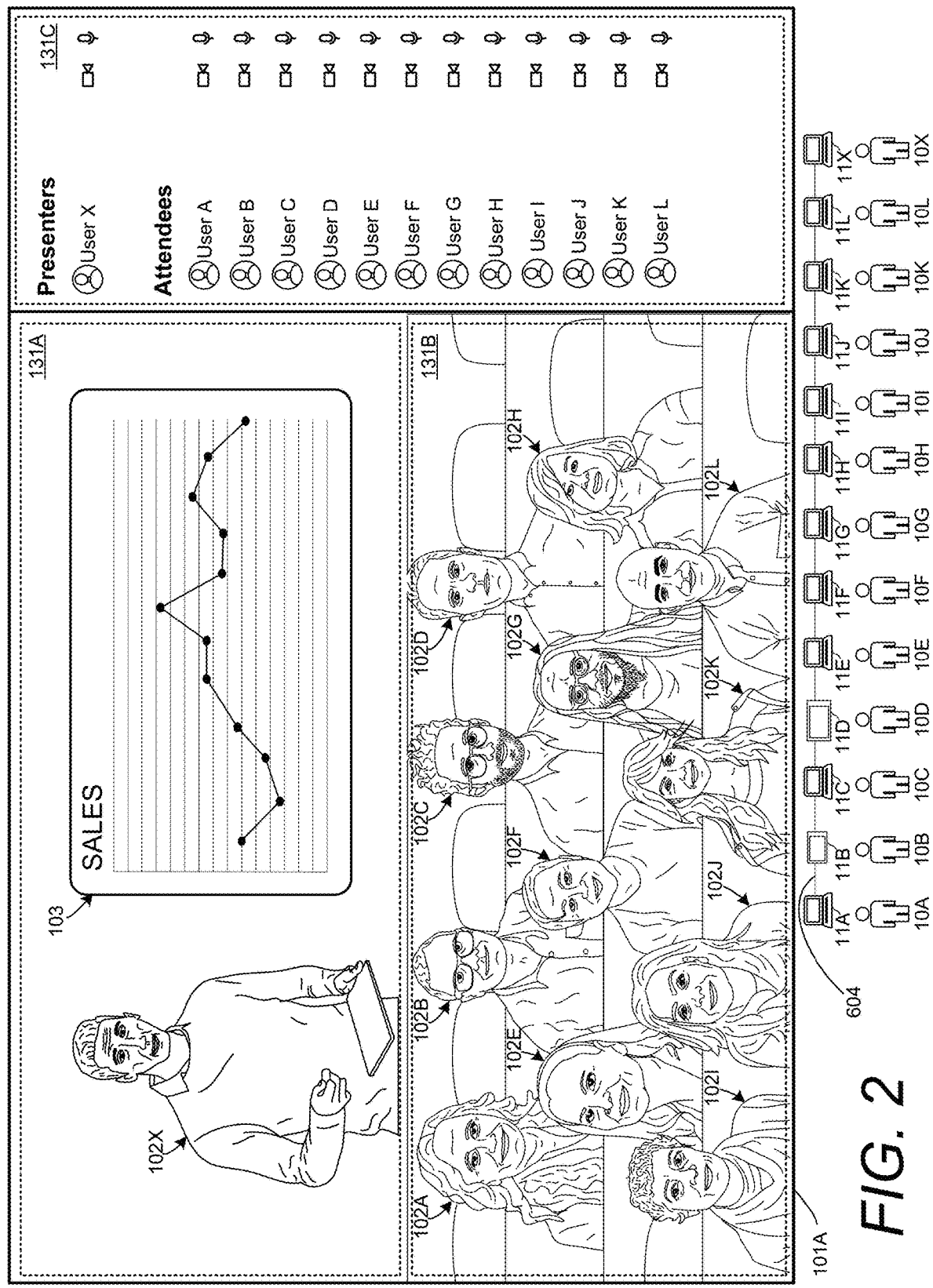
FIG. 2 is a block diagram of an example user interface for providing automated transitions between presenters of a communication session.

Similar to the user interface 101A of FIG. 1A, FIG. 2 shows a user interface 101A in a state where a user 10X is actively engaged in providing a presentation. In this state, the user interface 101A can include a primary presentation area 131A, an attendee image region 131B, and an attendee queue region 131C. The primary presentation region 131A can include a display of presentation content 103 and a rendering of a presenter 102X. The system can store and utilize permission data to allow the presenter 102X to control the display of the content 103 on the user interface 101A, which can be displayed to each user 10. The attendee image region 131B, also referred to herein as the Together Mode region 131B, can include individual renderings 102A-102L of the video streams of a plurality of participants 10A-10L individually communicating from remote devices 11A-11L. The attendee queue region 131C can show a status of each participant 10A-10L in including an order in which participants are queued for a role transition to a presenter role.

Figure 3:
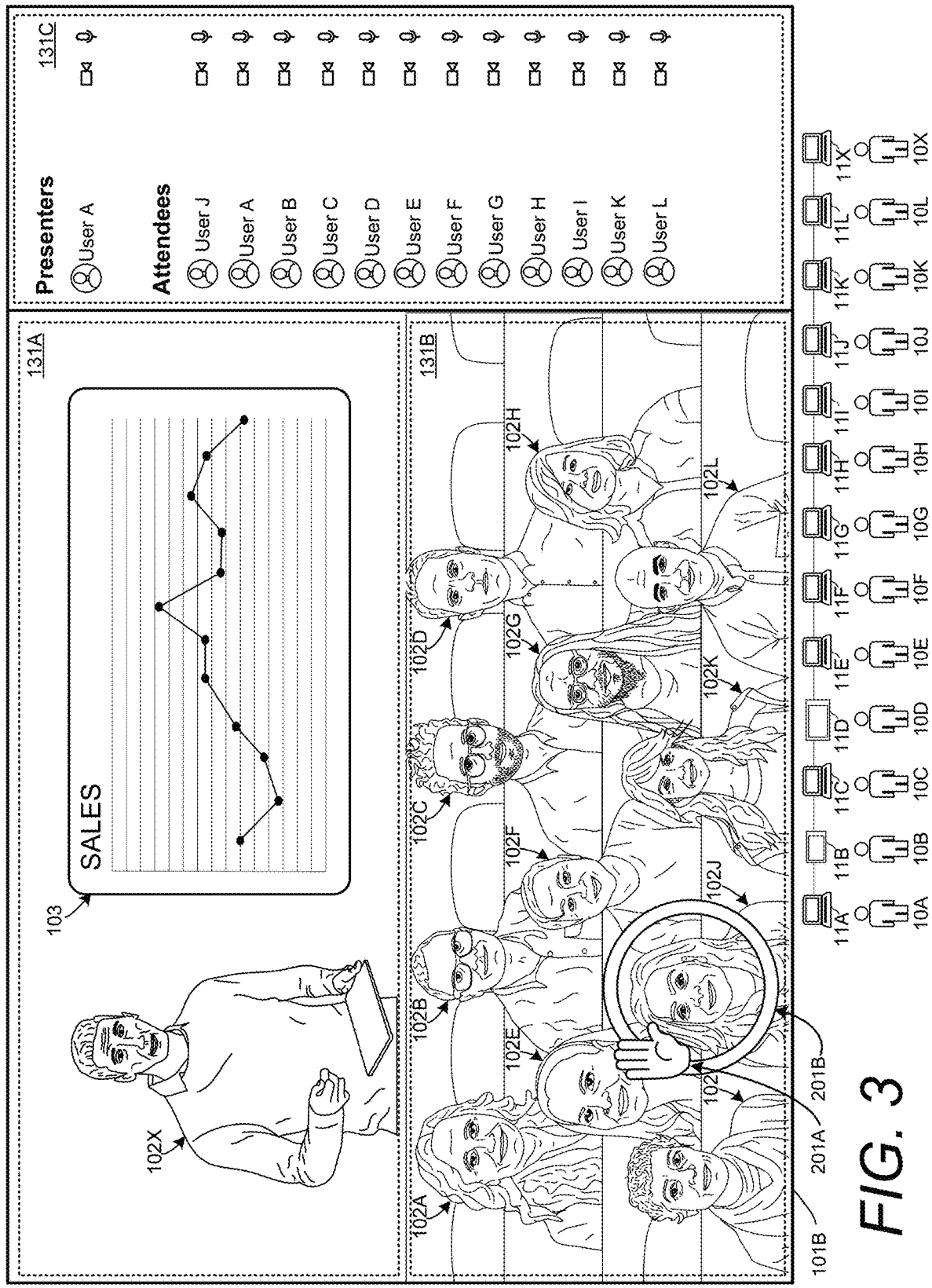
FIG. 3 is an example of an updated user interface showing another stage of a process for providing an automated transition of a rendering of a secondary presenter in a side-by-side format.

As shown in FIG. 3, in response to receiving the input from the user 10J, where the input indicates a request to share content, the system can cause a transition from the first user interface format 101A of FIG. 2 to the updated user interface format 101B shown in FIG. 3. In this example, the user interface 101B shown in FIG. 2 includes a primary presentation region 131A, the attendee image region 131B, and the attendee queue region 131C. In this embodiment, the secondary presentation region 131D display area may only be displayed at a later time or the secondary presentation region 131D may not be displayed in response to the input. In this embodiment, the attendee image region 131B of the updated user interface format 101B displaying one or more graphical elements 201 in association with a rendering 102J of the user 10J to indicate that the input provided by the user 10J. In this example, the first graphical element 201 includes a circle 201A around the rendering of the user 102J that provided the input. The graphical element 201 can also include a graphic that shows a raised hand 201B.

Figure 4:
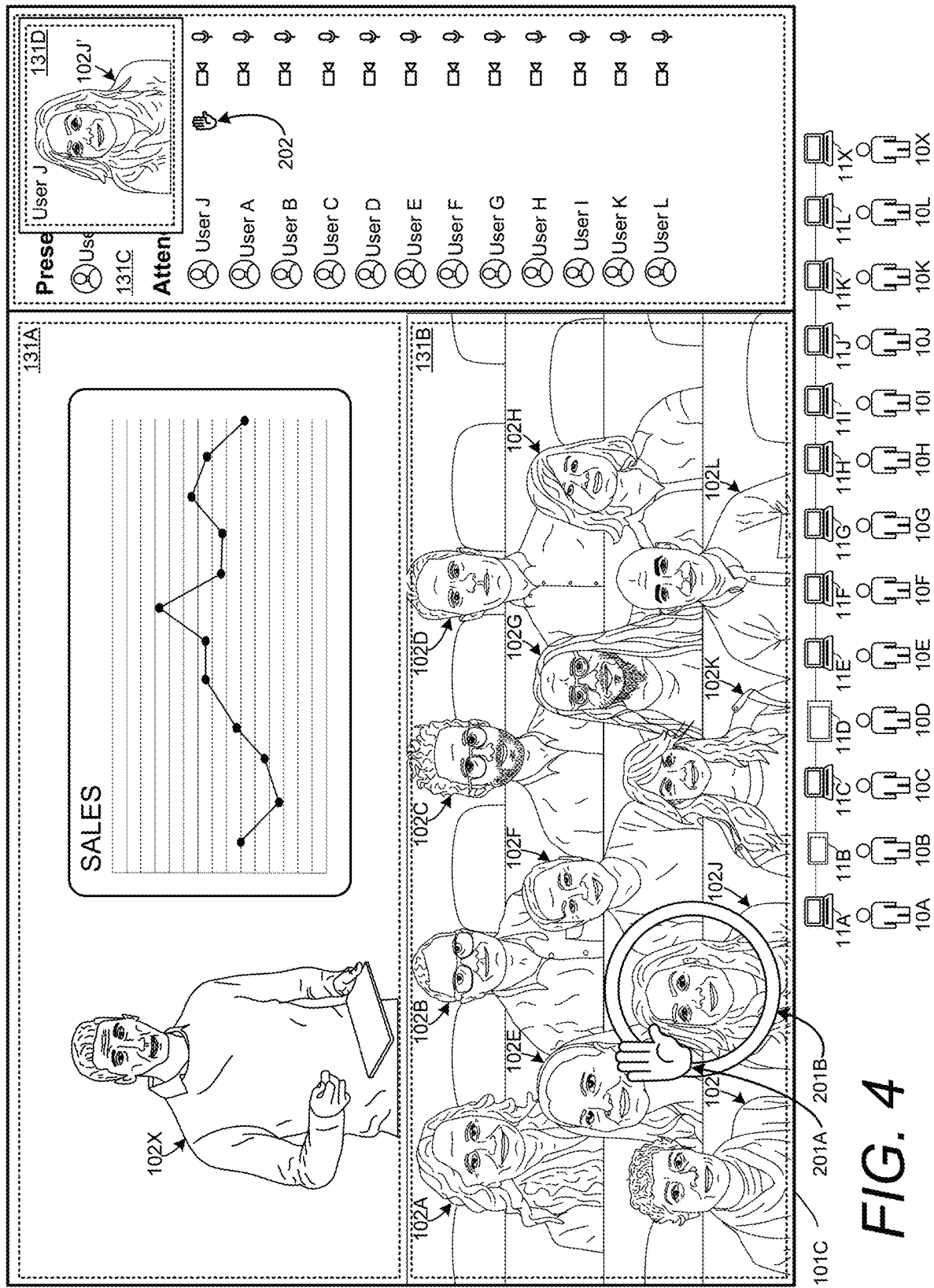
FIG. 4 is an example of an updated user interface showing a second stage of a process for providing an automated transition between two different presenters of a communication session.

The system can further cause the display of notifications and a secondary presenter display region 131D in the attendee queue region 131C. This example is shown in FIG. 4. The updated user interface 101C of FIG. 4 may be displayed after a predetermined time delay after the updated user interface 101B is displayed. In this example, the updated user interface 101C shows a video of the user that is next in the queue. In some embodiments, the attendee queue region 131C of the updated user interface format 101C can also display a second graphical element 202 indicating the input by the user 10J. This second graphical element 202 can be displayed in association with an identifier 203 of the user 10J. The association can be made by aligning the second graphical element 202 with the identifier 203 of the user 10J that provided the input. The association can also be made by positioning the second graphical element 202 within a predetermined distance of the identifier 203 of the user 10J that provided the input.

In some configurations, the user interface can provide animated transitions between individual operating states. For example, the user interface 101C shown in FIG. 4 can transition to the user interface 101C shown in FIG. 6. As shown in FIG. 4, this state of the user interface includes a primary presentation region 131A, the attendee image region 131B, the attendee queue region 131C, and the secondary presentation region 131D. In this configuration, the secondary presentation region 131D is positioned over a portion of the attendee queue region 131C. This user interface arrangement enables the system to provide a graphical association between the secondary presentation region 131D and an identifier, e.g., a name or thumbnail view of the user that provided the request to share content.

Figure 5:
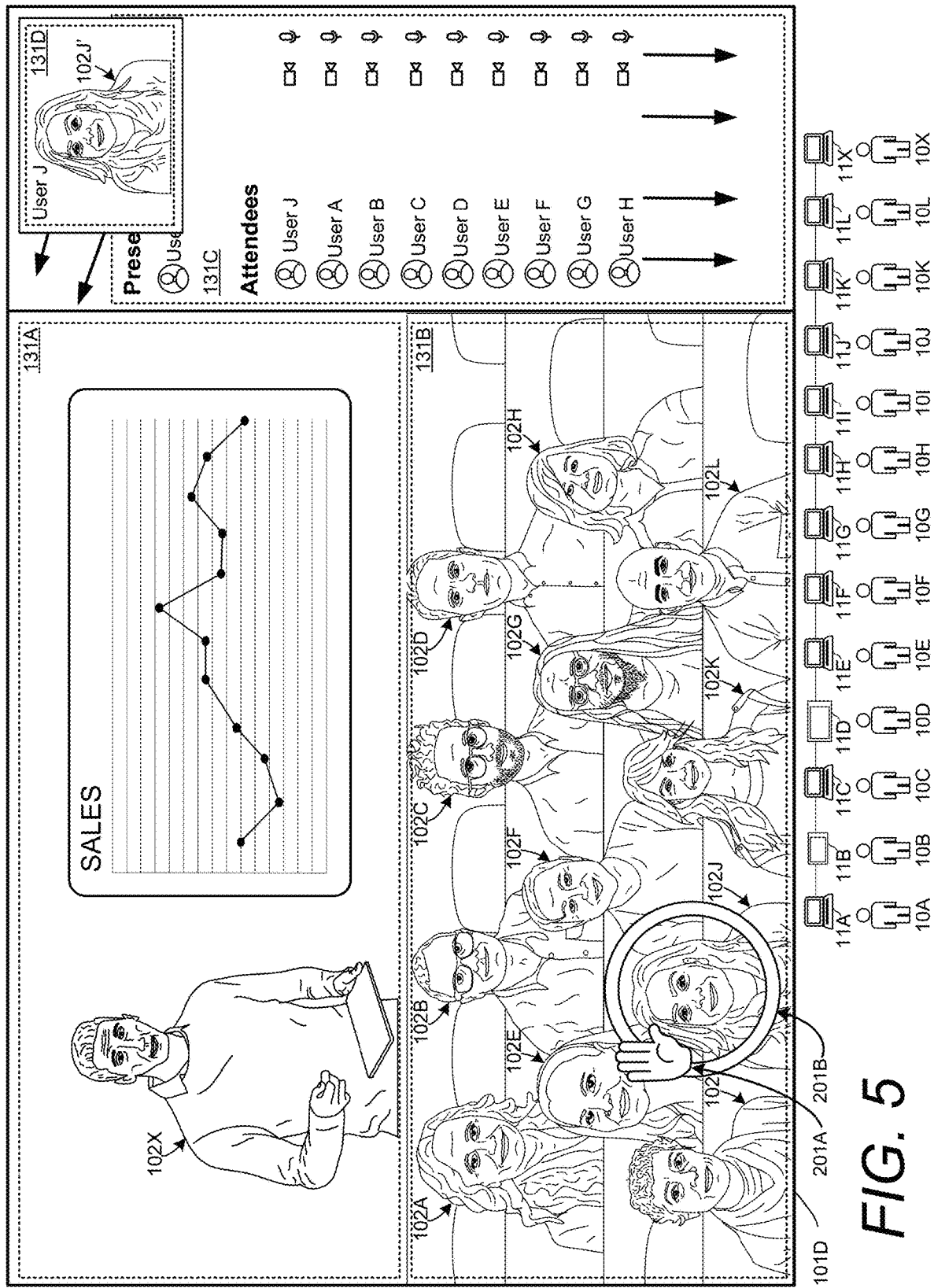
FIG. 5 is an example of an updated user interface showing another stage of a process for providing an automated transition of a rendering of a secondary presenter.

As shown in the transition between FIG. 4 and FIG. 5, the secondary presentation region 131D can move from a position that causes the secondary presentation region 131D to cover at least a portion of the user queue 204, to a new position that causes the secondary presentation region 131D to be in a non-overlapping arrangement with respect to the user queue 204. In some configurations, the non-overlapping arrangement with respect to the user queue 204 can include a side-by-side arrangement shown in FIG. 6.

Figure 7:
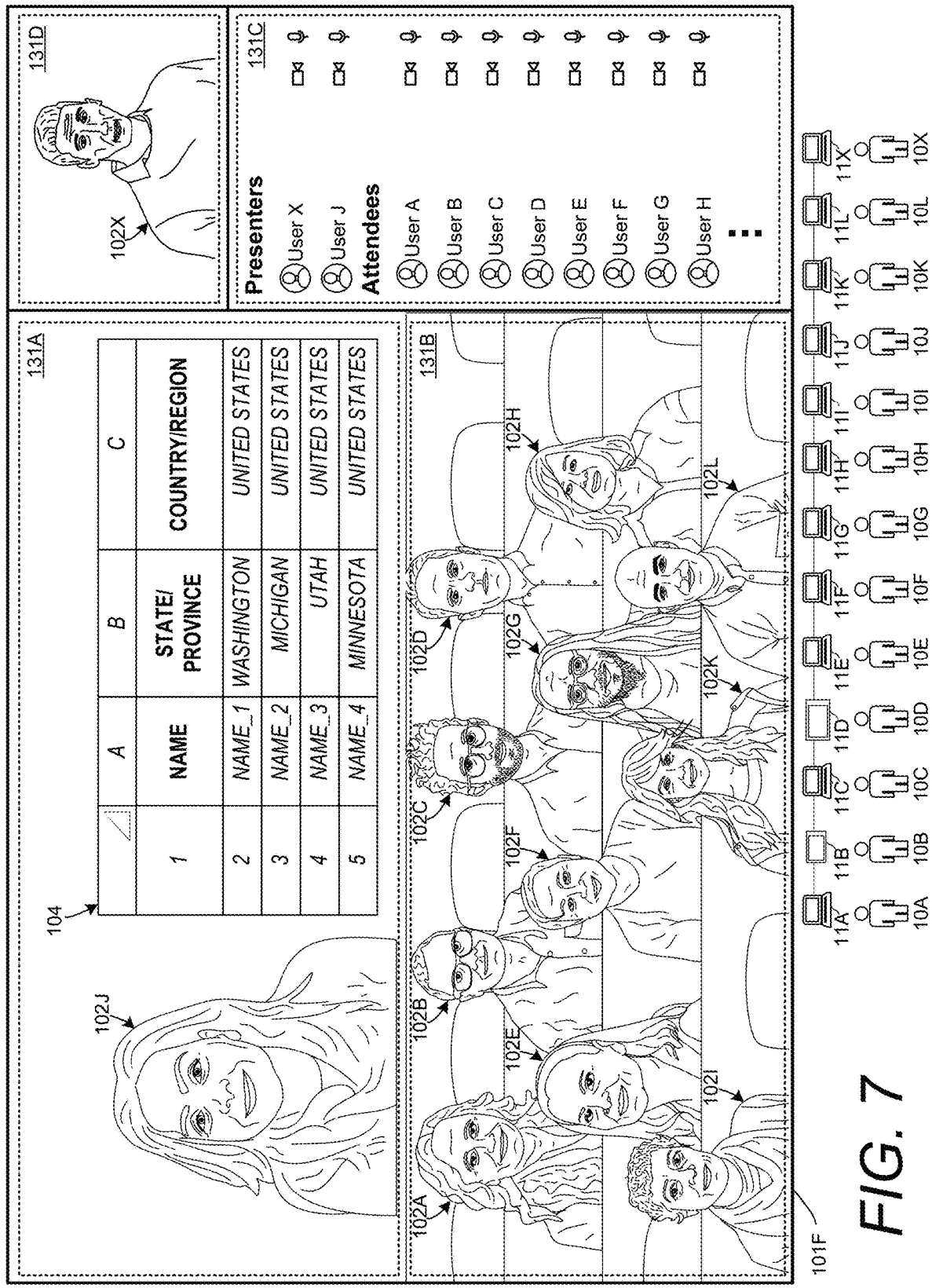
FIG. 7 is an example of an updated user interface showing another stage of a process for providing an automated transition of a rendering of a secondary presenter to a primary presentation area.

The system can also cause another transition to allow the requesting user 10J to display the rendering 102J of the user 10J I in the primary presentation area 131A, as shown in FIG. 7. This user interface 101F format can also include a modification to the system permissions, which can allow the requesting user 10J to have control over the primary presentation area 131A and provide a video in that region or a display of content 104 in that region.

These transitions can occur when the system detects a new event. For instance, any of the disclosed transitions can occur when the first presenter 102X completes a phase of a presentation, provides an input approving the requesting user to transition his or her renderings to a particular state, or the transitions can be based on a predetermined schedule. For instance, when a system includes phases of a meeting, e.g., introduction, presentation and Q&A, the transitions may occur at the end of beginning of each phase. For example, the transition from the user interface 101C of FIG. 4 to the user interface 101D format of FIG. 5 or the user interface 101E format of FIG. 6 may result when the meeting transitions to the Q&A phase. These transitions can occur based on an input from a user or based on a timed schedule. Any combination of transitions can occur from any of the user interface 101 formats disclosed herein based on events and detected conditions, such as a time threshold or a user input, described herein.

In some configurations, the queue can also cause a device to take actions on one or more time limits. There can be two types of time limits, e.g., timeouts. A first time limit can be based on a user action to start a presentation. When a user is given a time to speak, e.g., they are selected to present content to a main stage, they have a predetermined time to share content. If they do not share content or do not start speaking within that time limit, the system can revoke any permissions for sharing content and the system can select the next presenter in the queue.

A second time limit is based on a user's presentation. When a user is given a time to speak, e.g., they are presented on stage, that user can be allocated a predetermine time limit. The queue can be automated such that when that person's time is up, stage moves to the next presenter in the queue. This process can be done automatically or the process can also be done manually by a user input by a person having appropriate credentials. For example, a person having a role as a producer can terminate a presentation session for a particular user, thereby changing their permissions to share content, and selecting a person in the queue. The next person in the queue that is selected is allocated permissions for sharing content while the person who is ending a presentation is restricted from sharing content. Among many other technical benefits, these features allow the queue to stay current and help the progression of a meeting.

Figure 8:
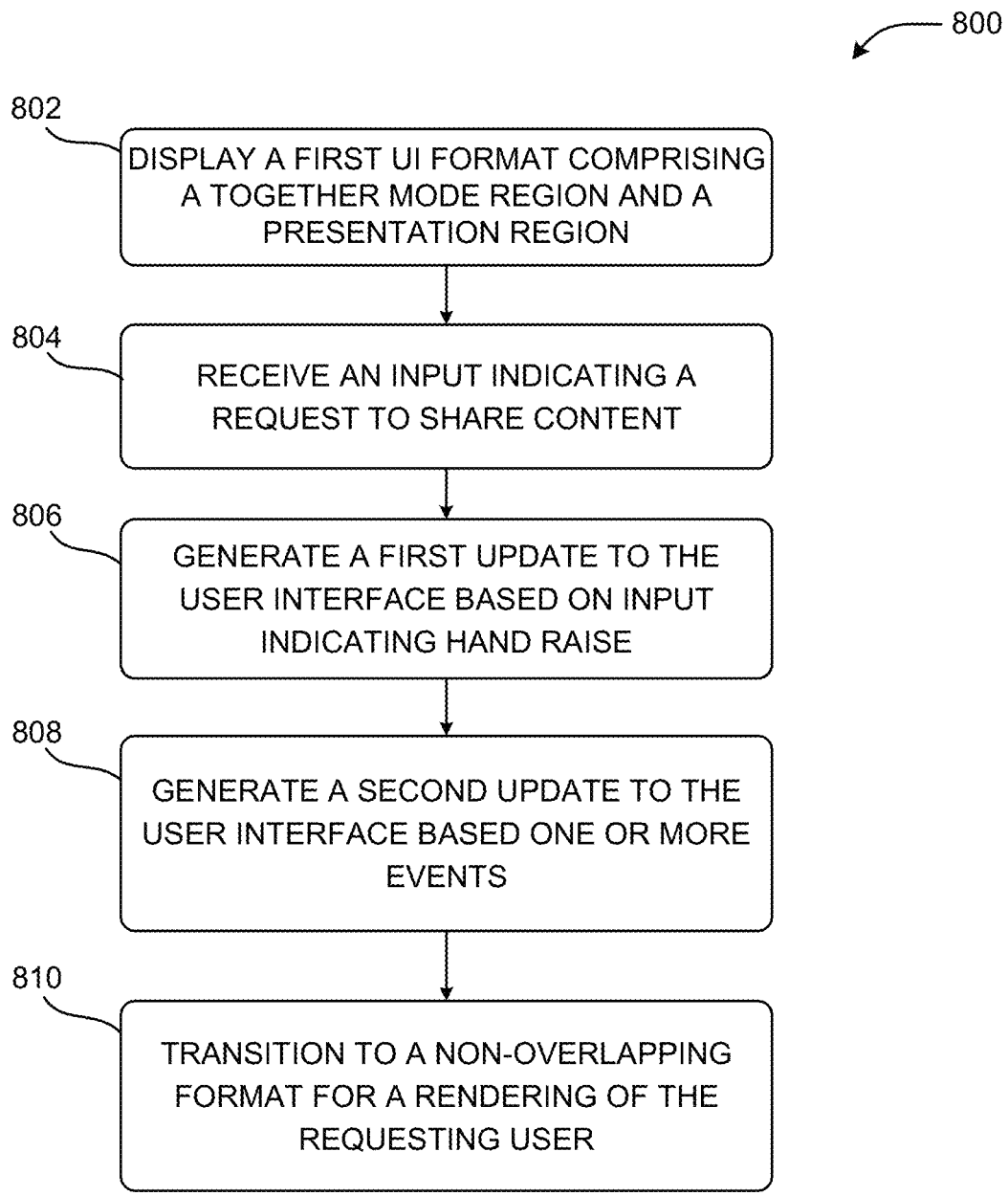
FIG. 8 is a flow diagram showing aspects of a routine for providing an automated transition between two different presenters of a communication session providing an automated transition between two different presenters of a communication session.

FIG. 8 is a diagram illustrating aspects of a routine 600 for providing automated transitions between presenters of a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 800 includes an operation 802 where the system causes one or more computing devices to display a first user interface format 101A comprising a primary presentation region 131A, an attendee image region 131B, and an attendee queue region 131C. The primary presentation region 131A can include a display of presentation content 103, such as the contents of a file, and a rendering of a presenter 102X, which is also referred to herein as the first presenter the original presenter, or the primary presenter. The attendee image region 131B, also referred to herein as the Together Mode region, can include individual renderings 102A-102L of the video streams of a plurality of participants 10A-10L individually communicating from remote computing devices 11A-11L, wherein the individual renderings 102A-102L each has a position relative to a seating configuration of a virtual environment 110. Each computer 11 can allow the participants 10 to communicate through a communication session 603, which can be configured with live audio and live video and content sharing features.

The primary communication session user interface, and other user interface arrangements disclosed herein, can be generated by operations for receiving the video streams from the remote computing devices, such as the client devices. The streams can be received by a client device or a server device. The streams can include an image of a person and a background of the person's surrounding environment. The system can apply a processing filter to each of the video streams to remove the background from the image. The system can then conform the video stream such that the video stream can generate a rendering shaped according to the image of the person. The system can also scale the image of each person to a predetermined size for compatibility with the seating configuration of the virtual environment, or to normalize each of the images to give the appearance that each person is in the same room.

Next, at operation 804, the system receives input data indicating a request to share content. The content to be shared can be in the form of video data and/or the contents of a file. The request can be a specific request to share content in a specific region of a meeting user interface, such as a presenter region or the attendee queue region 131C.

Next, at operation 806, the system can cause a transition from the first user interface format 101A of FIG. 1A to a second user interface format 101C comprising the primary presentation region 131A, as shown in FIG. 1B. The second user interface format 101C can include the attendee image region 131B, the attendee queue region 131C, and a secondary presentation region 131D, which may display a live video or an image for the user that provided the request. The transition can be in response to receiving the input indicating the request to share content.

In some configurations, the system can generate a graphical notice, such as a circle with a raised hand image in the Together Mode region. Thus, in some configurations, the attendee image region 131B of the second user interface format 101C can display a first graphical element 201 in association with a rendering 102J of the user 10J to indicate the input provided by the user 10J. In some configurations, the system can generate a graphical notice, such as a circle and/or a raised hand image in the attendee queue region 131C. In addition, the attendee queue region 131C can include a list of users that can be modified based on the timing of received requests. For instance, if the second user 10B provides a request to share content after the other user 10J, the queue will list the other user 10J as the next presenter then the second user 10B would be listed as the second upcoming presenter. Thus, in some embodiments, the attendee queue region 131C of the second user interface format 101C can display a second graphical element 202 for providing notice of the input of the user 10J. In addition, the second graphical element 202 can be displayed in association with an identifier 203 of the user 10J. This allows other attendees to see who has raised their hand on a list of users that can be sorted based on an order according to the timing of the requests. In some configurations, the attendee queue region 131C of the second user interface format 101C can include the second rendering 102J' of the user 10J. In some configurations, the second rendering 102J' of the user 10J can be displayed outside of the attendee queue region 131C and displayed concurrently with the primary presentation region 131A, which may show a rendering of the original presenter.

In operation 808, the system can cause a second update to the user interface based on one or more events. In one example, the system can cause a transition from the user interface format of FIG. 4 or FIG. 6 to the user interface format of FIG. 7. This means that the next speaker, e.g., an on-deck speaker, can move to the main stage of a meeting. In this embodiment, the system can transition the second rendering 102J' of the user 10J to the primary presentation region 131A. In some embodiments, the system can also remove the rendering 102J of the user from the attendee image region 131B.

In operation 810, the system can cause a transition of a user interface to move the rendering 102J' of the requesting user to a location that does not overlap with another graphical feature, such as the queue, another rendering of a user, or a user's identifier. In some configurations, operation 810 can include any function that moves a rendering of the requesting user 10J to a position and/or size that removes any overlap that inhibits the display of another graphical feature. This transition, e.g., the movement of a rendering of the requesting user, may be executed after a predetermined time period, in response to an input of the original presenter, or after the original presenter completes a phase of a presentation, etc.

The technical effects of the routine and other aspects disclosed herein include reducing the amount of bandwidth and computational cycles used by computing systems that provide a communication session for users. This is achieved by the use of the management of the permissions, the automation of the UI, and the Together Mode features that provide more cohesion to a user group, which leads to improved interaction between each person and their respective computers. Further, by providing controlled user interface transitions and permission transitions, a system can improve user engagement and reduce user fatigue. This can improve the efficacy of a meeting by allowing users to and avoid the need for additional meetings to discuss missed information, emails requesting missed information, a need for a playback of a recording of a meeting, etc. As a result, the disclosed systems and methods can significantly reduce the use of memory, computing cycles, and bandwidth utilization.

Figure 9:
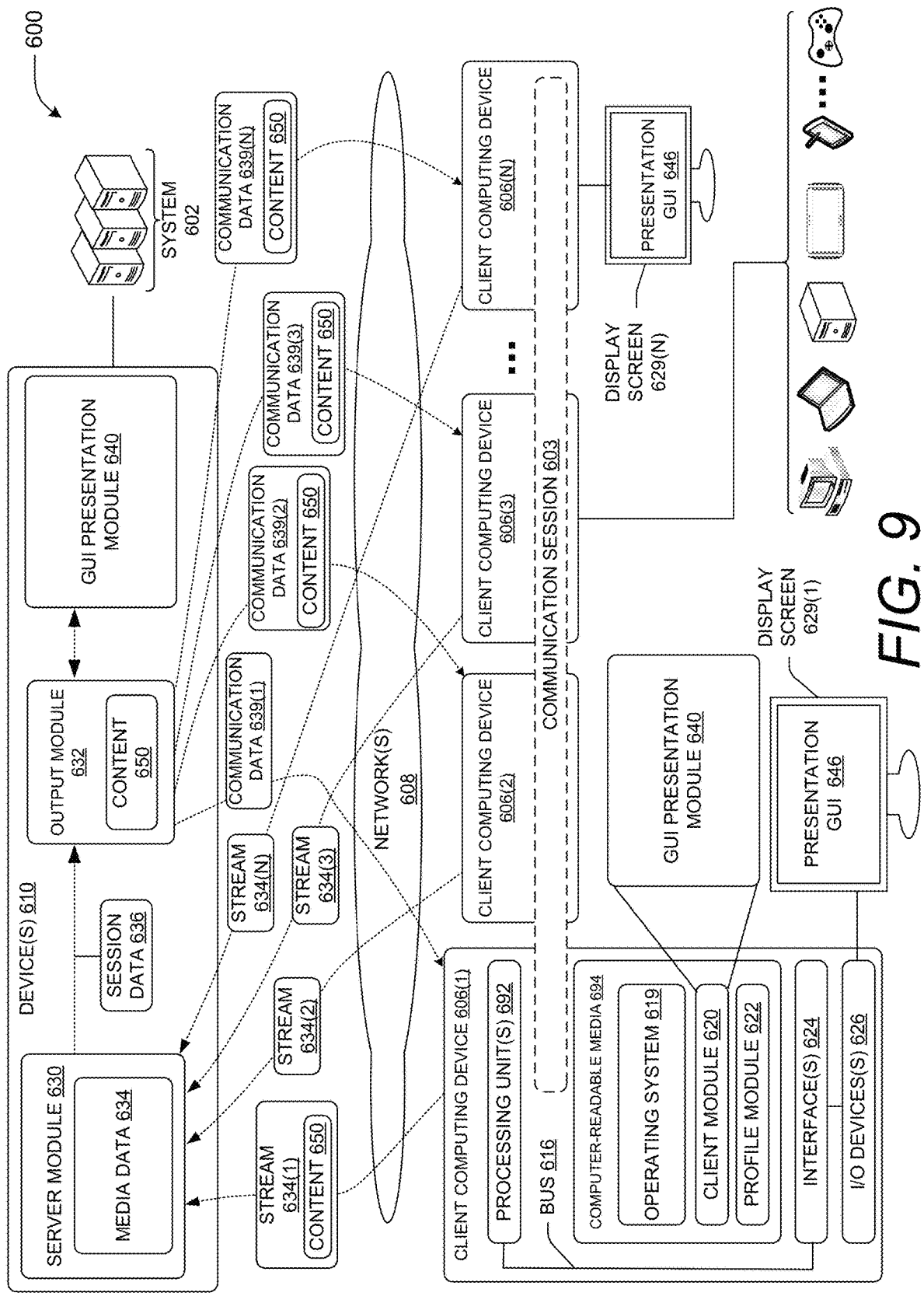
FIG. 9 is a computer architecture diagram illustrating an illustrative computer hardware and software architecture for a computing system capable of implementing aspects of the techniques and technologies presented herein.

FIG. 9 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations. A communication session 603 can include a start time and an end time, which can determine when video streams and live audio can be shared. Text and content can be shared outside of the start time and end time.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 9 illustrates that client computing device 606(1) is in some way connected to a display device (e.g., a display screen 629(N)), which can display a UI according to the techniques described herein.

In the example environment 600 of FIG. 9, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 9) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 9, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 10:
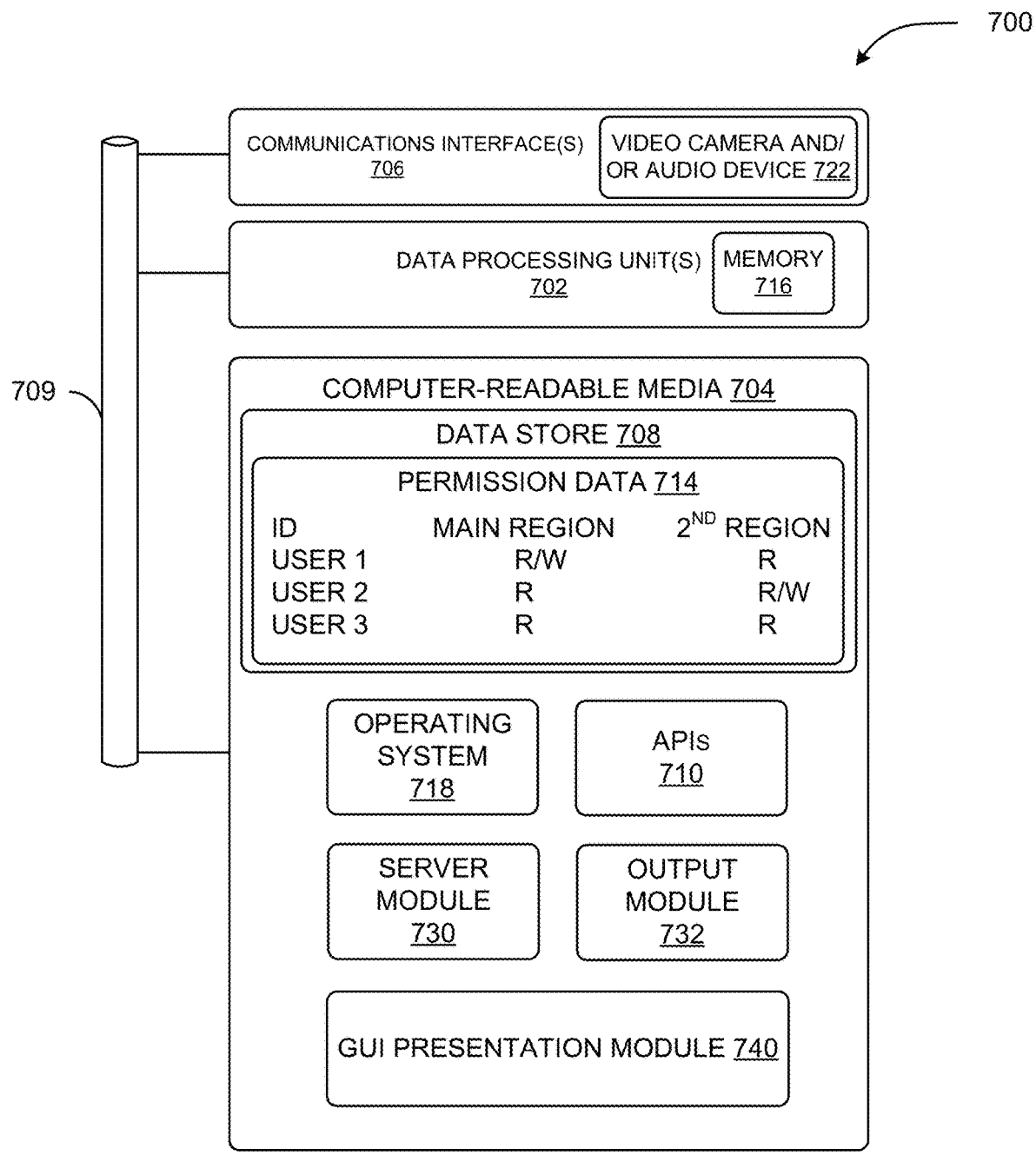
FIG. 10 is a computer architecture diagram illustrating a computing device architecture for a computing device capable of implementing aspects of the techniques and technologies presented herein.

FIG. 10 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 9), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include permission data 714, to indicate the access rights of each user. The access rights can be on a per user and per user interface region basis. Thus, at this granular level, the first user can have rights to see the content shared on the primary presenter region and also share content on the primary presenter region, which are respectively read and write permissions. At the same time, the first user can only have rights to see the contents of the second region (e.g., the Together Mode region) but not contribute to that region, e.g., the user cannot be displayed on the Together Mode region unless that user has write permissions. In this example, the second user can only view the main region but not contribute any content to that region. In this example, the third user can view each region of the user interface 101 but not contribute to any region. In this case, the third user can provide a request to share content, then go through the processes described herein to gain rights to contribute to a particular region. The rights granted to a particular UI region in response to a request can be temporary, e.g., granted for a predetermined time period, granted until they finish a presentation, or granted while sharing a document, and once the document is removed from a sharing status, the rights can revert back to the original rights of a user.

The permission data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. A person's level can be used by the system to determine if that person can receive updated rights or if that person can approve rights of another person that has submitted a request to share content. For example, an event director may have rights to approve a request for a requesting user to share content with a specific region of a user interface. Certain meeting attendees, such as a first group of audience members may also be allowed to be promoted to a presenter status, while other attendees, such as a second group of audience members may be restricted from being promoted to a presenter status.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following example clauses are for supplementing the present detailed description. In some configurations, the UI starts in Together Mode, Detects Hand Raise and transitions to UI format with Video of the attendee next in queue will be automatically displayed in the secondary display area.

Clause A: A method for automating transitions for user interface formats for communication sessions, wherein the method configured for execution on a computing system (700) comprises: causing a display of a first user interface format (101A) comprising a primary presentation region (131A), an attendee image region (131B), and an attendee queue region (131C), the primary presentation region (131A) comprising a display of presentation content (103) and a rendering of a presenter (102X), the attendee image region (131B) comprising individual renderings (102A-102L) of the video streams of a plurality of participants (10A-10L) individually communicating from remote computing devices (11A-11L), wherein the individual renderings (102A-102L) each has a position relative to a seating configuration of a virtual environment (110), wherein the computing system (700) allows the plurality of participants to communicate through a communication session (603); receiving an input from a computing device (11J) of a user (10J), the input indicating a request to share content (e.g., detecting hand raise. Defined as a request to share content (video or a data file); in response to receiving the input indicating the request to share content, causing a transition from the first user interface format (101A) to a second user interface format (101C) comprising the primary presentation region (131A), the attendee image region (131B), the attendee queue region (131C), and a secondary presentation region (131D), e.g., FIG. 1B shows a second user interface format with the secondary video display area and the next speaker, Hand Raise of Page 6 of Jason's Deck; the attendee image region (131B) of the second user interface format (101C) displaying a first graphical element (201) in association with a rendering (102J) of the user (10J) to indicate the input provided by the user (10J), (e.g., "circle with raised hand in page 6" of Jason's Deck, in Together Mode Region) and the attendee queue region (131C) of the second user interface format (101C) displaying a second graphical element (202) indicating the input by the user (10J), the second graphical element (202) displayed in association with an identifier (203) of the user (10J), a position of the identifier (203) in a user queue (204) indicating that the user (10J) is an upcoming presenter, the attendee queue region (131C) of the second user interface format (101C) further comprising a second rendering (102J') of the user (10J). (e.g., FIG. 1B includes a raised hand in queue area" and the "Video of the attendee next in queue will be automatically displayed in the secondary 'presenter' display area.")

Clause B: The method, medium, or system of any of the example clauses provided herein, wherein the input indicating the request to share content is generated by receiving video data defining a predetermined gesture performed by the user, e.g., the input is from video data of the performing a gesture, such as raising a hand.

Clause C: The method, medium, or system of any of the example clauses provided herein, wherein the input indicating the request to share content is generated by receiving video data defining a predetermined gesture performed by the user, wherein the predetermined gesture comprises a movement of a hand of the user in an upward direction, e.g., the input is caused by a specific hand raising gesture.

Clause D: The method, medium, or system of any of the example clauses provided herein, wherein the input indicating the request to share content is generated by receiving video data defining a predetermined gesture performed by the user, wherein the predetermined gesture comprises a movement of a hand of the user being raised a predetermined height, e.g., the input is caused by a specific hand raising gesture at a specific height.

Figure 6:
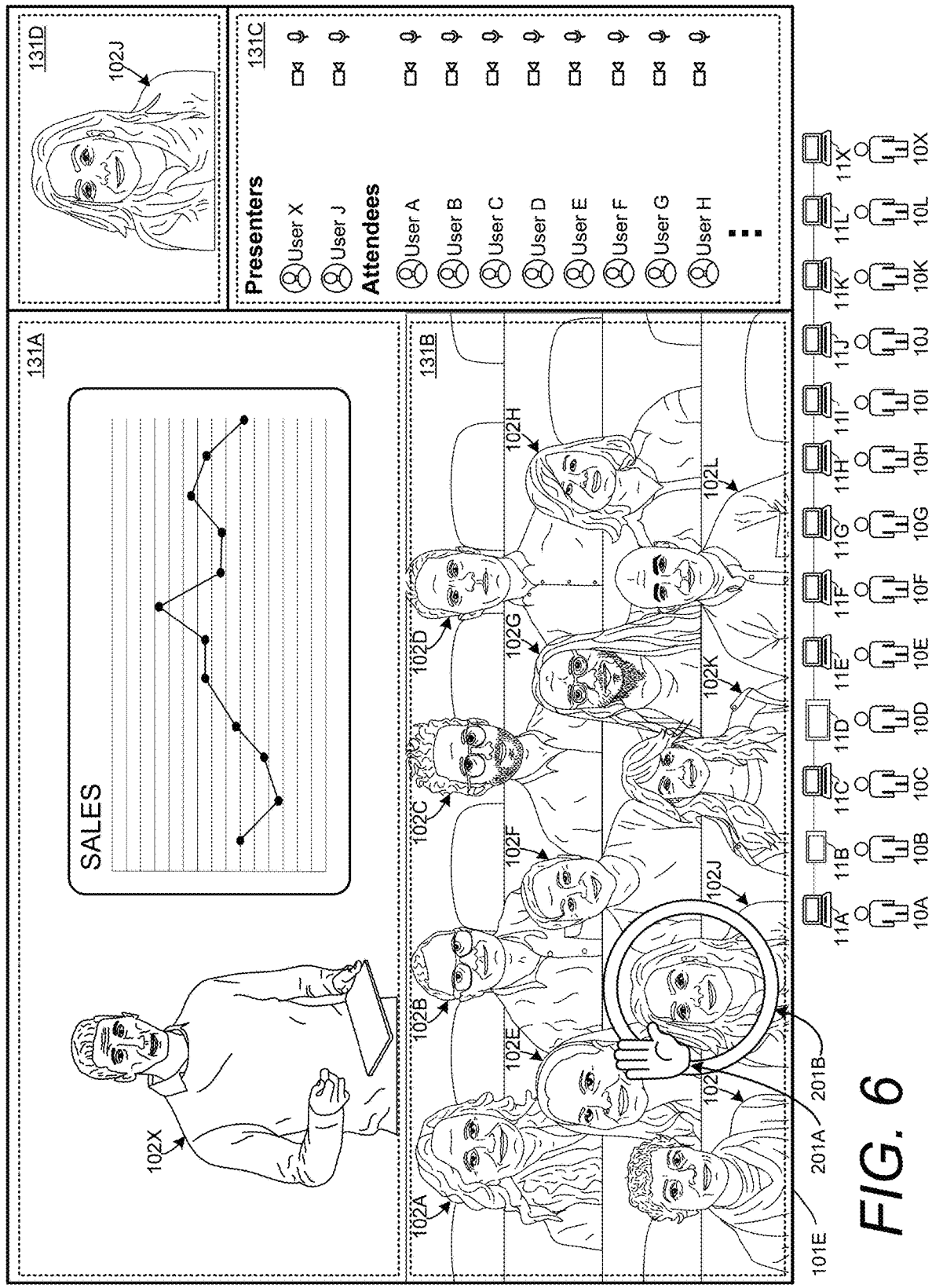
FIG. 6 is an example of an updated user interface showing another stage of a process for providing an automated transition of a rendering of a secondary presenter in a side-by-side format.

Clause E: The method, medium, or system of any of the example clauses provided herein, wherein the secondary presentation region (131D) starts at a first position in response to the input, the first position causing the secondary presentation region (131D) to overlap with at least a portion of the user queue (204), wherein secondary presentation region (131D) moves to a second position after a predetermined time, the second position causing the secondary presentation region (131D) to be in a non-overlapping arrangement with respect to the user queue (204), e.g., FIGS. 4-6: the second presenter starts as an overlay on the queue (FIG. 4) and then transitions to non-overlay format (FIG. 6).

Clause F: The method, or medium, or system of any of the example clauses provided herein, wherein the method further comprises: transitioning the second rendering (102J') of the user (10J) to the primary presentation region (131A); and removing the rendering (102J) of the user from the attendee image region (131B) of the second user interface format (101C), e.g., FIG. 7: transition from FIG. 4 to FIG. 6, next speaker on-deck moves to main stage.

Clause G: The method, medium, or system of any of the example clauses provided herein, wherein permission data is updated in response to the input, the update granting the user with write permissions to the primary presentation region, wherein contents of a file associated with the user are rendered within the primary presentation region in response to the update granting the user with write permissions.

Clause H: A computing device (700), comprising: one or more processing units (702); and a computer-readable storage medium (704) having encoded thereon computer-executable instructions to cause the one or more processing units (802) to perform a method comprising: causing a display of a first user interface format (101A) comprising a primary presentation region (131A), an attendee image region (131B), and an attendee queue region (131C), the primary presentation region (131A) comprising a display of presentation content (103) and a rendering of a presenter (102X), the attendee image region (131B) comprising individual renderings (102A-102L) of the video streams of a plurality of participants (10A-10L) individually communicating from remote computing devices (11A-11L), wherein the individual renderings (102A-102L) each has a position relative to a seating configuration of a virtual environment (110), wherein the computing system (700) allows the plurality of participants to communicate through a communication session (603); receiving an input from a computing device (11J) of a user (10J), the input indicating a request to share content; in response to receiving the input indicating the request to share content, causing a transition from the first user interface format (101A) to a second user interface format (101C) comprising the primary presentation region (131A), the attendee image region (131B), the attendee queue region (131C), and a secondary presentation region (131D), the attendee image region (131B) of the second user interface format (101C) displaying a first graphical element (201) in association with a rendering (102J) of the user (10J) to indicate the input provided by the user (10J), and the attendee queue region (131C) of the second user interface format (101C) displaying a second graphical element (202) indicating the input by the user (10J), the second graphical element (202) displayed in association with an identifier (203) of the user (10J), a position of the identifier (203) in a user queue (204) indicating that the user (10J) is an upcoming presenter, the attendee queue region (131C) of the second user interface format (101C) further comprising a second rendering (102J') of the user (10J).

Clause I: The method, medium, or system of any of the example clauses provided herein, wherein the first user interface format (101A) and the second user interface format (101C) are directed to a remote computing device associated with a user having a predetermined role for controlling the display of content, wherein the remote computing device is configured to allow the user having a predetermined role to approved a display of the user associated with the request within the primary presentation region, wherein an audience user interface format is displayed to other users having permissions to view the presentation content but not share other content.

Clause J: The method, medium, or system of any of the example clauses provided herein, wherein the input indicating the request to share content is generated by receiving video data defining a predetermined gesture performed by the user, wherein the predetermined gesture comprises a movement of a hand of the user in an upward direction.

Clause K: The method, medium, or system of any of the example clauses provided herein, wherein the input indicating the request to share content is generated by receiving video data defining a predetermined gesture performed by the user, wherein the predetermined gesture comprises a movement of a hand of the user being raised a predetermined height.

Clause L: The method, medium, or system of any of the example clauses provided herein, wherein the secondary presentation region (131D) starts at a first position in response to the input, the first position causing the secondary presentation region (131D) to overlap with at least a portion of the user queue (204), wherein secondary presentation region (131D) moves to a second position after a predetermined time, the second position causing the secondary presentation region (131D) to be in a non-overlapping arrangement with respect to the user queue (204).

Clause M: The method, medium, or system of any of the example clauses provided herein, wherein the method further comprises: transitioning the second rendering (102J') of the user (10J) to the primary presentation region (131A); and removing the rendering (102J) of the user from the attendee image region (131B) of the second user interface format (101C).

Clause N: The method, medium, or system of any of the example clauses provided herein, wherein permission data is updated in response to the input, the update granting the user with write permissions to the primary presentation region, wherein contents of a file associated with the user are rendered within the primary presentation region in response to the update granting the user with write permissions.

Clause O: A computer-readable storage medium (704) having encoded thereon computer-executable instructions to cause the one or more processing units (802) of a system to perform a method comprising: causing a display of a first user interface format (101A) comprising a primary presentation region (131A), an attendee image region (131B), and an attendee queue region (131C), the primary presentation region (131A) comprising a display of presentation content (103) and a rendering of a presenter (102X), the attendee image region (131B) comprising individual renderings (102A-102L) of the video streams of a plurality of participants (10A-10L) individually communicating from remote computing devices (11A-11L), wherein the individual renderings (102A-102L) each has a position relative to a seating configuration of a virtual environment (110), wherein the computing system (700) allows the plurality of participants to communicate through a communication session (603); receiving an input from a computing device (11J) of a user (10J), the input indicating a request to share content; in response to receiving the input indicating the request to share content, causing a transition from the first user interface format (101A) to a second user interface format (101C) comprising the primary presentation region (131A), the attendee image region (131B), the attendee queue region (131C), and a secondary presentation region (131D), the attendee image region (131B) of the second user interface format (101C) displaying a first graphical element (201) in association with a rendering (102J) of the user (10J) to indicate the input provided by the user (10J), and the attendee queue region (131C) of the second user interface format (101C) displaying a second graphical element (202) indicating the input by the user (10J), the second graphical element (202) displayed in association with an identifier (203) of the user (10J), a position of the identifier (203) in a user queue (204) indicating that the user (10J) is an upcoming presenter, the attendee queue region (131C) of the second user interface format (101C) further comprising a second rendering (102J') of the user (10J).

Clause P: The method, medium, or system of any of the example clauses provided herein, wherein the input indicating the request to share content is generated by receiving video data defining a predetermined gesture performed by the user.

Clause Q: The method, medium, or system of any of the example clauses provided herein, wherein the input indicating the request to share content is generated by receiving video data defining a predetermined gesture performed by the user, wherein the predetermined gesture comprises a movement of a hand of the user in an upward direction.

Clause R: The method, medium, or system of any of the example clauses provided herein, wherein the input indicating the request to share content is generated by receiving video data defining a predetermined gesture performed by the user, wherein the predetermined gesture comprises a movement of a hand of the user being raised a predetermined height.

Clause S: The method, medium, or system of any of the example clauses provided herein, wherein the secondary presentation region (131D) starts at a first position in response to the input, the first position causing the secondary presentation region (131D) to overlap with at least a portion of the user queue (204), wherein secondary presentation region (131D) moves to a second position after a predetermined time, the second position causing the secondary presentation region (131D) to be in a non-overlapping arrangement with respect to the user queue (204), wherein permission data is updated to grant the user with write permissions to the primary presentation region for a predetermined time, wherein the granted write permissions are revoked after the predetermined time, and the write permissions are granted to the next person in the queue.

Clause T: The method, medium, or system of any of the example clauses provided herein, wherein the method further comprises: transitioning the second rendering (102J') of the user (10J) to the primary presentation region (131A); and removing the rendering (102J) of the user from the attendee image region (131B) of the second user interface format (101C).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for automating transitions for user interface formats for communication sessions, wherein the method configured for execution on a computing system comprises:
    causing a display of a first user interface format comprising a primary presentation region, an attendee image region, and an attendee queue region, the primary presentation region comprising a display of presentation content and a rendering of a presenter, the attendee image region comprising individual renderings of the video streams of a plurality of participants individually communicating from remote computing devices, wherein the individual renderings each has a position relative to a seating configuration of a virtual environment, wherein the computing system allows the plurality of participants to communicate through a communication session;
    receiving an input from a computing device of a user, the input indicating a request to share content;
    in response to receiving the input indicating the request to share content, causing a transition from the first user interface format to a second user interface format comprising the primary presentation region, the attendee image region, the attendee queue region, and a secondary presentation region,
    the attendee image region of the second user interface format displaying a first graphical element in association with a rendering of the user to indicate the input provided by the user, and
    the attendee queue region of the second user interface format displaying a second graphical element indicating the input by the user, the second graphical element displayed in association with an identifier of the user, a position of the identifier in a user queue indicating that the user is an upcoming presenter, the attendee queue region of the second user interface format further comprising a second rendering of the user.

2. The method of claim 1, wherein the input indicating the request to share content is generated by receiving video data defining a predetermined gesture performed by the user.

3. The method of claim 1, wherein the input indicating the request to share content is generated by receiving video data defining a predetermined gesture performed by the user, wherein the predetermined gesture comprises a movement of a hand of the user in an upward direction.

4. The method of claim 1, wherein the input indicating the request to share content is generated by receiving video data defining a predetermined gesture performed by the user, wherein the predetermined gesture comprises a movement of a hand of the user being raised a predetermined height.

5. The method of claim 1, wherein the secondary presentation region starts at a first position in response to the input, the first position causing the secondary presentation region to overlap with at least a portion of the user queue, wherein secondary presentation region moves to a second position after a predetermined time, the second position causing the secondary presentation region to be in a non-overlapping arrangement with respect to the user queue.

6. The method of claim 1, wherein the method further comprises:
    transitioning the second rendering of the user to the primary presentation region; and
    removing the rendering of the user from the attendee image region of the second user interface format.

7. The method of claim 1, wherein permission data is updated in response to the input, the update granting the user with write permissions to the primary presentation region, wherein contents of a file associated with the user are rendered within the primary presentation region in response to the update granting the user with write permissions.

8. A computing device, comprising:
    one or more processing units; and
    a computer-readable storage medium having encoded thereon computer-executable instructions to cause the one or more processing units to perform a method comprising:
    causing a display of a first user interface format comprising a primary presentation region, an attendee image region, and an attendee queue region, the primary presentation region comprising a display of presentation content and a rendering of a presenter, the attendee image region comprising individual renderings of the video streams of a plurality of participants individually communicating from remote computing devices, wherein the individual renderings each has a position relative to a seating configuration of a virtual environment, wherein the computing system allows the plurality of participants to communicate through a communication session;
    receiving an input from a computing device of a user, the input indicating a request to share content;

in response to receiving the input indicating the request to share content, causing a transition from the first user interface format to a second user interface format comprising the primary presentation region, the attendee image region, the attendee queue region, and a secondary presentation region, the attendee image region of the second user interface format displaying a first graphical element in association with a rendering of the user to indicate the input provided by the user, and the attendee queue region of the second user interface format displaying a second graphical element indicating the input by the user, the second graphical element displayed in association with an identifier of the user, a position of the identifier in a user queue indicating that the user is an upcoming presenter, the attendee queue region of the second user interface format further comprising a second rendering of the user.

9. The computing device of claim 8, wherein the first user interface format and the second user interface format are directed to a remote computing device associated with a user having a predetermined role for controlling the display of content, wherein the remote computing device is configured to allow the user having a predetermined role to approved a display of the user associated with the request within the primary presentation region, wherein an audience user interface format is displayed to other users having permissions to view the presentation content but not share other content.

10. The computing device of claim 8, wherein the input indicating the request to share content is generated by receiving video data defining a predetermined gesture performed by the user, wherein the predetermined gesture comprises a movement of a hand of the user in an upward direction.

11. The computing device of claim 8, wherein the input indicating the request to share content is generated by receiving video data defining a predetermined gesture performed by the user, wherein the predetermined gesture comprises a movement of a hand of the user being raised a predetermined height.

12. The computing device of claim 8, wherein the secondary presentation region starts at a first position in response to the input, the first position causing the secondary presentation region to overlap with at least a portion of the user queue, wherein secondary presentation region moves to a second position after a predetermined time, the second position causing the secondary presentation region to be in a non-overlapping arrangement with respect to the user queue.

13. The computing device of claim 8, wherein the method further comprises:
transitioning the second rendering of the user to the primary presentation region; and
removing the rendering of the user from the attendee image region of the second user interface format.

14. The computing device of claim 8, wherein permission data is updated in response to the input, the update granting the user with write permissions to the primary presentation region, wherein contents of a file associated with the user are rendered within the primary presentation region in response to the update granting the user with write permissions.

15. A computer-readable storage medium having encoded thereon computer-executable instructions to cause the one or more processing units of a system to perform a method comprising:
causing a display of a first user interface format comprising a primary presentation region, an attendee image region, and an attendee queue region, the primary presentation region comprising a display of presentation content and a rendering of a presenter, the attendee image region comprising individual renderings of the video streams of a plurality of participants individually communicating from remote computing devices, wherein the individual renderings each has a position relative to a seating configuration of a virtual environment, wherein the computing system allows the plurality of participants to communicate through a communication session;

receiving an input from a computing device of a user, the input indicating a request to share content;

in response to receiving the input indicating the request to share content, causing a transition from the first user interface format to a second user interface format comprising the primary presentation region, the attendee image region, the attendee queue region, and a secondary presentation region, the attendee image region of the second user interface format displaying a first graphical element in association with a rendering of the user to indicate the input provided by the user, and the attendee queue region of the second user interface format displaying a second graphical element indicating the input by the user, the second graphical element displayed in association with an identifier of the user, a position of the identifier in a user queue indicating that the user is an upcoming presenter, the attendee queue region of the second user interface format further comprising a second rendering of the user.

16. The computer-readable storage medium of claim 15, wherein the input indicating the request to share content is generated by receiving video data defining a predetermined gesture performed by the user.

17. The computer-readable storage medium of claim 15, wherein the input indicating the request to share content is generated by receiving video data defining a predetermined gesture performed by the user, wherein the predetermined gesture comprises a movement of a hand of the user in an upward direction.

18. The computer-readable storage medium of claim 15, wherein the input indicating the request to share content is generated by receiving video data defining a predetermined gesture performed by the user, wherein the predetermined gesture comprises a movement of a hand of the user being raised a predetermined height.

19. The computer-readable storage medium of claim 15, wherein the secondary presentation region starts at a first position in response to the input, the first position causing the secondary presentation region to overlap with at least a portion of the user queue, wherein secondary presentation region moves to a second position after a predetermined time, the second position causing the secondary presentation region to be in a non-overlapping arrangement with respect to the user queue, wherein permission data is updated to grant the user with write permissions to the primary presentation region for a predetermined time, wherein the granted write permissions are revoked after the predetermined time, and the write permissions are granted to the next person in the queue.

20. The computer-readable storage medium of claim 15, wherein the method further comprises:
   transitioning the second rendering of the user to the primary presentation region; and
   removing the rendering of the user from the attendee image region of the second user interface format.

\* \* \* \* \*